(12) United States Patent
Eckerdt

(10) Patent No.: US 8,690,069 B2
(45) Date of Patent: Apr. 8, 2014

(54) KEY COMBINATION WITH ELECTRONIC MEMORY IDENTIFIER

(75) Inventor: George H Eckerdt, Fisher, NY (US)

(73) Assignee: Key Systems, Inc., Fishers, NY (US)

( * ) Notice: Subject to any disclaimer, the term of this patent is extended or adjusted under 35 U.S.C. 154(b) by 0 days.

(21) Appl. No.: 13/589,472

(22) Filed: Aug. 20, 2012

(65) Prior Publication Data

US 2014/0048606 A1 Feb. 20, 2014

(51) Int. Cl.
*G06K 19/06* (2006.01)

(52) U.S. Cl.
USPC ............................ 235/492; 235/375; 70/408

(58) Field of Classification Search
USPC ................. 235/492, 375, 383, 451, 382, 439; 70/278.2, 115–117, 119–123, 408, 70/278.3
See application file for complete search history.

(56) References Cited

U.S. PATENT DOCUMENTS

| | | | |
|---|---|---|---|
| 5,311,757 A * | 5/1994 | Spahn | 70/408 |
| 5,768,925 A * | 6/1998 | Ozawa et al. | 70/408 |
| 5,775,148 A * | 7/1998 | Layton et al. | 70/408 |
| 6,232,876 B1 | 5/2001 | Maloney | |
| D456,852 S | 5/2002 | Maloney | |
| 6,392,543 B2 | 5/2002 | Maloney | |
| 6,424,260 B2 | 7/2002 | Maloney | |
| 6,637,245 B1 | 10/2003 | Bolton | |
| 6,707,380 B2 | 3/2004 | Maloney | |
| 6,862,908 B2 * | 3/2005 | Seki | 70/408 |
| 6,927,670 B1 * | 8/2005 | Gokcebay et al. | 340/5.65 |
| 7,036,950 B1 * | 5/2006 | Freeman et al. | 362/100 |
| 2001/0020896 A1 | 9/2001 | Higuchi | |
| 2003/0000267 A1 * | 1/2003 | Jacob et al. | 70/399 |
| 2003/0051520 A1 * | 3/2003 | Janssen et al. | 70/278.3 |
| 2003/0159481 A1 * | 8/2003 | McGuire et al. | 70/408 |
| 2005/0229662 A1 * | 10/2005 | Banks | 70/278.3 |
| 2008/0258869 A1 | 10/2008 | Ognjenovic | |

* cited by examiner

*Primary Examiner* — Edwyn Labaze

(57) ABSTRACT

Disclosed is a method of providing a compact, tamper-evident means of combining individual keys with unique electronic memory identifiers. The disclosure involves a holder that is manufactured to attach some form of electronic identification, such as a touch memory button, to the head of a key. Once attached, the assembly can be mounted and read electronically to continually account for the identification, presence, access rights, and removal or replacement of the assembly from storage. Application of the key holder would not require alteration of the key in any manner, and thus could occur when the individual keys are either ready for distribution or already distributed and in regular use. The key holder would preferably be tamper-evident and prevent removal of the touch memory button without destruction of the holder, and possibly even the key itself.

17 Claims, 4 Drawing Sheets

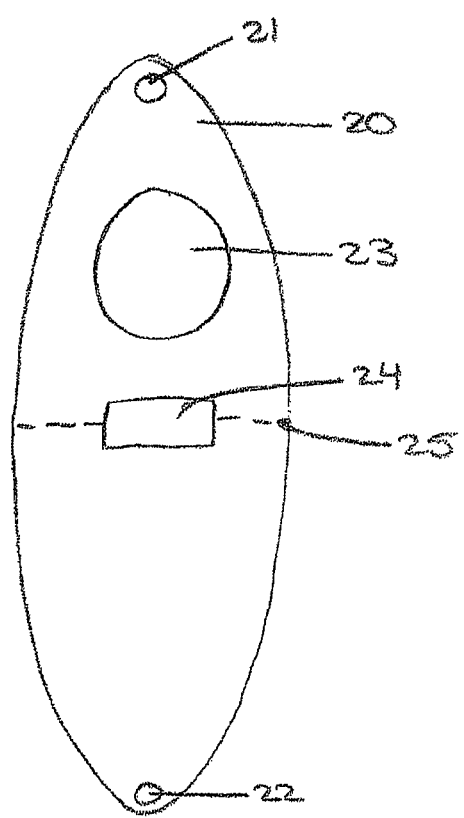

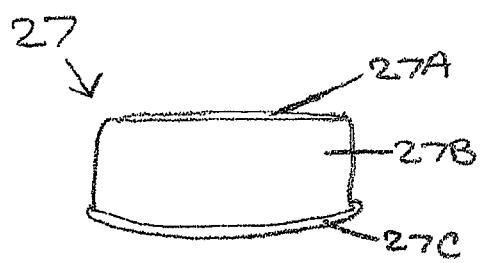
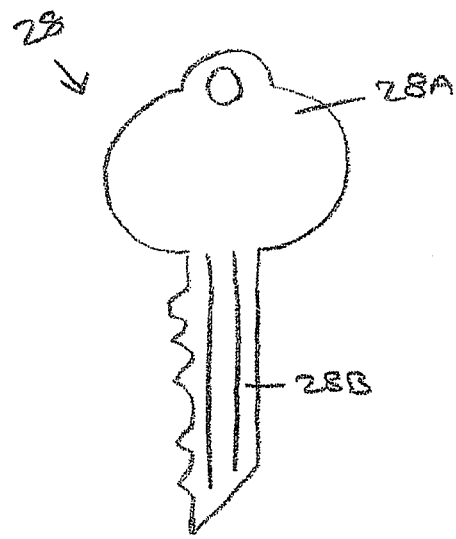
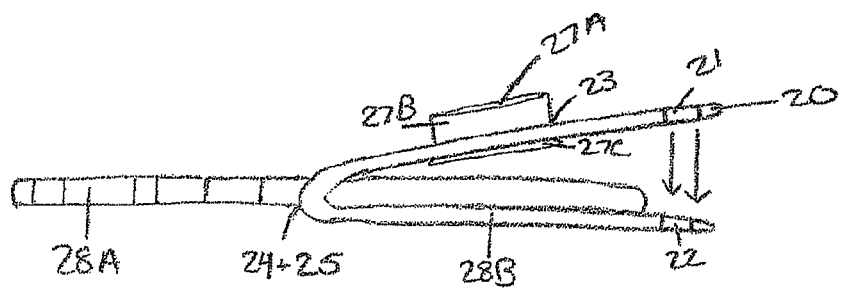

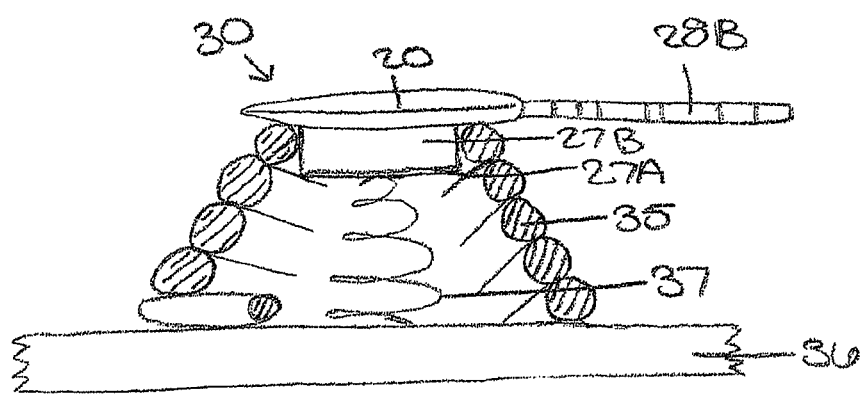

KEY COMBINATION WITH ELECTRONIC MEMORY IDENTIFIER

FIELD OF INVENTION

Keys and key identification and security.

BACKGROUND

In the interests of asset protection, the numbers of locks and keys owned by a single entity continuously grows, making it increasingly difficult for that entity to manage those keys. A growing need therefore exists for conveniently identifying, storing, and managing a multitude of keys.

Lock owners have sought methods of attaching identification to keys in a manner that makes the identity indiscernible from mere observation. Electronic memory devices have provided a method by which key owners can continually account for key related events including identification, lock association, access rights, and storage events, such as presence, absence, replacement, or removal from the storage unit. With this information key owners can securely monitor a secure system involving a multitude of keys and locks. Usually memory devices are monitored by a storage unit which serves not only to secure the keys when not in use, but to provide the communication channels between the keys and a managing server. By requiring access codes to open the system and access specific items within the system, not only does the system keep track of who removed a key, and how long it was gone, but also sets off an alarm if the item is overdue in returning. This allows lock owners to monitor who has access to their assets and ensures the assets will likely be returned in a timely manner.

To date these memory devices have been attached to keys and other assets by means of some form of tag. The memory device is affixed to the tag, which is then attached to the asset by means of a wire or a ring. For example, touch memory buttons have been attached to keys by means of either a flat, tongue-like card or a smaller tag. The card is finger-length, and attaches to the asset by means of a ring. While this allows multiple keys to share the same touch memory button, the ring could easily be removed, rendering the identification obsolete. The tag is a bit smaller and attaches the keys by wire, but still allows multiple keys to share the same touch memory button. As opposed to the card, once the wire is sealed within the tag it cannot be re-opened, rendering the assembly tamper evident. However, both of these solutions can be bulky, especially if carrying more than one assembly at a time. Also, to give each individual key a touch memory button would become cumbersome due to the size of the tags and the rings. These shortcomings have left lock owners in search of a compact, tamper-evident method of providing individual keys with unique electronic memory.

SUMMARY

The problem of providing a compact, tamper-evident means of combining individual keys with unique electronic memory is solved by an embodiment involving a holder that is made to attach some form of electronic memory identifier to the head of a key. An example of how such a holder can work is the application of touch memory buttons to the heads of individual keys. Once attached, these assemblies can be mounted and read electronically to continually account for the identification, presence, access rights, and removal or replacement of the keys.

Such a holder is preferably manufactured from a durable material and dimensioned to snugly enclose the head of the key. Such a holder could have a fold in the center allowing it to bend such that the opposing faces ends enclose the key head and fasten together. The manner of fastening would be designed to allow a single closure and prevent re-opening or tampering. In the case of touch memory, the holder would fold around the key head and fasten in such a manner that the lip of the memory button is held snugly between the face of the holder and the respective face of the key head. The memory button and key shank would protrude outward, allowing these items to function unhindered. The holder could also have an additional opening through which a key ring could be inserted.

Application of a holder as preferred would not require alteration of the key head in any manner, and thus could occur when the individual keys are either ready for distribution or already distributed and in regular use. A holder meeting the above description would preferably be manufactured at a small thickness, allowing a significant amount of the touch memory button to protrude from the casing, thus increasing functionality of the button. Once attached the touch memory button extends from the holder and is inserted into an electrically conductive mount that serves to both store the key and read information from the touch memory button. The memory button is then made to serve two purposes: one being a unique electronic identification for the individual key, and the other being a means of mounting and securely storing the key.

The key assembly would be comparable in size to the key itself, rendering it compact and less cumbersome for carrying multiples or carrying in small spaces, such as pockets. The ability to connect a key ring would allow a single user to carry multiple keys, each with their own individual electronic memory, on a single key ring. Also, carrying multiple keys would not require the carrying of separate rings and tags for each key, since the electronic memory identifier is affixed to the key itself.

DRAWINGS

FIG. 1 is a partially schematic top view of the holder showing the location of the openings and the fold prior to application.

FIG. 2A is a schematic view of the touch memory button.

FIG. 2B is a schematic view of a key.

FIG. 3 is a partially schematic side view showing the application of the holder of FIG. 1 to the head of a key, specifically showing how the key shank and touch memory button are secured with the opposing faces of the holder bend along the fold.

FIG. 6 is a schematic cross-sectional view of the completed assembly wherein the touch memory button is releasably mounted to a conductive coil spring.

DETAILED DESCRIPTION

Figure 4:
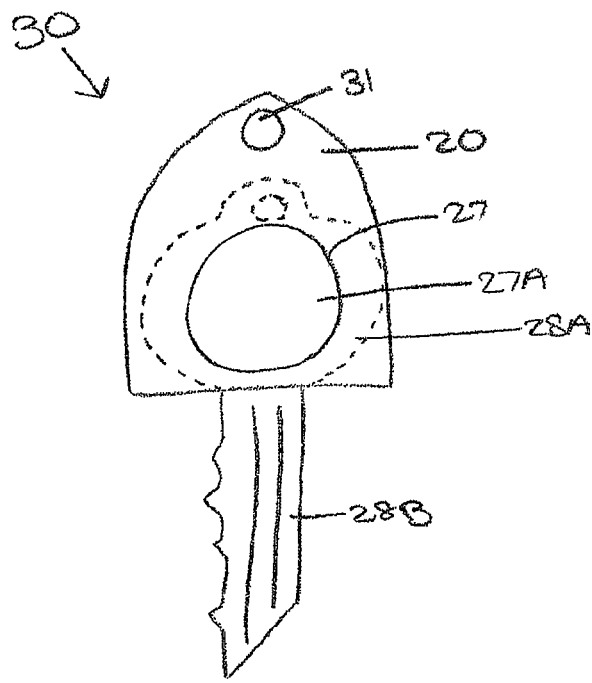
FIG. 4 is a frontward perspective of the completed application of the holder of FIGS. 1 and 3 attaching a touch memory button to the head of a key, with the orientation of the key beneath the holder depicted in broken lines.

The preferred embodiment disclosed involves a key holder manufactured to attach an electronic memory identifier to the head of a key in a compact, tamper-evident manner. This embodiment preferably involves a holder manufactured from a durable material and dimensioned to compactly attach to the head of the key. This holder preferably fastens to the key and to the memory device in such a manner as to make any separation tamper evident. Such a holder and its implementation are illustrated in FIGS. 1-6. The use of such a holder to attach a touch memory button is only one example of how an embodiment can be manufactured and implemented to attach some form of unique electronic memory to individual keys.

The embodiment illustrated in FIG. 1 comprises a substantially planar holder 20 that preferably has a fold 25 in the center as illustrated. Through the fold 25 is an opening 24 that is just large enough to fit the shank of a key. Two openings 21 and 22 would be located such that the openings line up when the casing is bent at the fold. Another opening 23, preferably centered to one side of the fold 25, receives and holds the electronic memory identifier.

The holder 20 illustrated in FIG. 1 is preferably used to combine the items shown in FIGS. 2A and 2B in a quasi-permanent manner. The touch memory button illustrated in FIG. 2A comprises a cylindrical casing 27B that surrounds the entirety of the circuitry, a contiguous lower surface that extends slightly beyond the edge of the cylinder creating a lip 27C, and an upper contact surface 27A that is insulated from the remainder of the casing. The bottom surface of the casing has a lip 27C that protrudes slightly beyond the cylinder. The opening 23 illustrated in the holder in FIG. 1 would be specifically cut such that the cylindrical casing 27B of the touch memory button fits snugly through the opening, but the lip 27C at the bottom of the button rests firmly against the face of the holder 20 and prevents the button from passing entirely through.

The illustration in FIG. 2B specifies the parts of a key as they relate to the application of such a holder. The holder folds around the head 28A of the key with opposing faces of the holder engaging the opposing faces of the key head 28A respectively, with the touch memory button 27 held firmly against the head of the key 28A. Once affixed to the key, this memory button can be mounted and read electronically to continually account for the identification, presence, access rights, and removal or replacement of the key, and the key shank 28B protrudes downward from the holder and remains fully functional.

FIG. 3 illustrates the preferred method of passing the key shank 28B through the center opening 24 and attaching the holder to the head of the key 28A. The holder 20 preferably has a small thickness so as to allow more of the cylindrical portion of the touch memory button to protrude in order to increase functionality of the button. The fold 25 allows the holder 20 to bend in such a manner that the opposing faces of the holder 20 attach to the respective opposing faces of the key head 28A that did not fit through the opening 24. Once the holder is folded, the end openings 21 and 22 meet forming a single hole at the edge of the holder. The holder then fastens in such a way that the lip 27C of the touch memory button is secured against the head of the key 29 and the cylindrical portion 27B portion of the memory button protrudes outward from the holder 20.

FIG. 4 illustrates the completed combination 30 of the preferred embodiment showing the front view of a holder 20 attaching the touch memory button 27 to the head of the key with the contact surface 27A of the memory button protruding outward. Once the fastening is complete there preferably remains an opining 31 in the holder 20 through which a key ring can be inserted. The full length of the key shank 28B extends downward from the holder 20 as illustrated so as to allow the traditional functionality of the key. The orientation of the key head 28A as it is engaged by the opposing face of the holder 20 and held beneath the touch memory button 27 is shown in broken lines.

Figure 5:
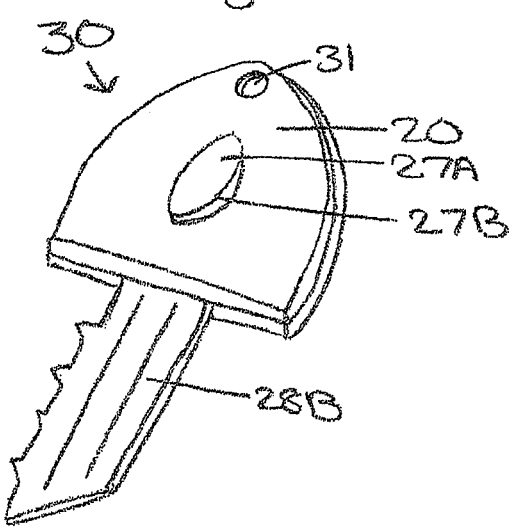
FIG. 5 is a partially schematic perspective view of the completed assembly of FIGS. 3 and 4 showing the manner in which the smart button protrudes from the key holder.

FIG. 5 illustrates a perspective view of the combination 30 in which the cylindrical casing 27B of the touch memory button is shown protruding from the face of the holder 20. Holder 20 preferably has a narrow thickness such that most of the cylindrical portion 27B of the touch memory button protrudes outward from the head of the key. The memory button is then made to serve two purposes: one being a unique electronic memory for the individual key, and the other being a compact means of mounting and securely storing the key.

FIG. 6 illustrates a schematic, cross-sectional view of the means by which the combination 30 would be mounted. A gripping coil 35 is attached to a support surface 36 that is preferably a circuit board having a contact spring 37 and conductive paths. The gripping coil 35 surrounds the touch memory button canister 27B and affords a grip strong enough to releasably support both the canister 27B and the key and holder combination 30. Once the canister 27B is inserted, the electrically conductive coil spring 35 serves to both mount the key and read information from the touch memory button contact surface 27A through the connection made by the contact spring 37 and the button.

A combination such as the one illustrated in FIGS. 4-6 is preferably built of a material sufficiently durable to render the cover tamper-evident and prevent removal of the touch memory button without destruction of the holder, and possibly the key itself. Preferably the application of such holder containing electronic memory would not require alteration of the key head in any manner.

Touch memory buttons are not the only form of electronic memory that can be attached to a key head using the proposed method. The opening through the holder can be resized or removed at the manufacturing phase to adapt the holder to different forms of memory devices. A similar holder could also be manufactured consisting of two separate pieces that, when joined together, create an opening through which the key shank extends. The holder can fasten in a variety of manners, including but not limited to flanges, snaps, clasps, pins, adhesives, and epoxy. Such a holder can also be created in varying thicknesses and without any sort of opening for the insertion of key rings. However, any of these alternatives still provide a compact, tamper-evident means of combining individual keys with unique electronic memory for both identification and mounting purposes.

I claim:

1. A key combination comprising:
   a memory identifier providing an electronically accessible identity for the key:
   a holder retaining the identifier against a head of the key;
   a mount structured to releasably grip the identifier to support the key and key holder;
   the mount is also structured to read the electronic identity; and
   the holder is structured to make any separation of the identifier and the key a tamper-evident event.

2. The combination of claim 1 wherein the holder has a pair of opposed faces respectively engaging opposite faces of the key head.

3. The combination of claim 2 wherein one face of the holder has an opening through which the identifier extends to engage the mount.

4. The combination of claim 1 wherein the holder has an aperture that can receive a key ring.

5. A key combination comprising:
   a memory identifier providing the key with an electronically readable identity;
   a holder retaining the identifier against a head of the key, the holder having opposite faces engaging opposite faces of the head of the key;
   the memory identifier protruding through a face of the holder; and
   the holder faces being structured to make any removal of the memory identifier from the key a tamper-evident event.

6. The combination of claim 5 wherein a surface of the memory identifier releasably mounts on a circuit board that electronically reads the identity.

7. The combination of claim 6 wherein the memory identifier mounts within a coil of a conducting spring.

8. The combination of claim 5 wherein the holder has an aperture that can receive a key ring.

9. The combination of claim 5 wherein the holder faces are inseparable unless tampered.

10. A key management system comprising:
    a memory device providing an electronically readable memory;
    the memory device being releasably mountable on a circuit board that reads the memory;
    a holder securing the memory device against a head of the key so that mounting the memory device also mounts the key; and
    the holder being structured to trap the memory device against a face of the key head and prevent removal of the memory device from the key without leaving evidence of tampering.

11. The system of claim 10 wherein a coil of a conductive spring on the circuit board grips the memory device.

12. The system of claim 10 wherein the holder has an aperture that can receive a key ring.

13. The system of claim 10 including the holder having opposite faces engaging opposite faces of the key head.

14. A key management system comprising:
    a memory device providing an electronically readable memory;
    a holder securing the memory device against a head of the key;
    a mount having a releasable grip on the memory device to support the memory device and the key in a mounted position; and
    the mount being arranged on a circuit board that electronically reads the memory device.

15. The combination of claim 14 wherein the holder has a pair of opposite faces engaging opposite faces of the key head.

16. The combination of claim 14 wherein a mount on the circuit board is formed as a spring having a coil that grips the key identifier.

17. The combination of claim 14 wherein the holder has an aperture that can receive a key ring.

* * * * *